(12) United States Patent
Christensen et al.

(10) Patent No.: US 7,395,617 B2
(45) Date of Patent: Jul. 8, 2008

(54) AIR PASSAGE DEVICE FOR INFLATABLE SHOE BLADDERS

(75) Inventors: Brian Christensen, Centerville, MA (US); Paul M. Davis, Blackstone, MA (US)

(73) Assignee: Reebok International Ltd., Canton, MA (US)

( * ) Notice: Subject to any disclaimer, the term of this patent is extended or adjusted under 35 U.S.C. 154(b) by 371 days.

(21) Appl. No.: 11/012,867

(22) Filed: Dec. 16, 2004

(65) Prior Publication Data
US 2006/0130369 A1    Jun. 22, 2006

(51) Int. Cl.
*A43B 7/14* (2006.01)
(52) U.S. Cl. .................. 36/45; 36/29; 36/88; 156/292; 156/308.4
(58) Field of Classification Search .............. 36/29, 36/88, 45, 93; 156/145, 242, 292, 308.4
See application file for complete search history.

(56) References Cited

U.S. PATENT DOCUMENTS

| | | | | |
|---|---|---|---|---|
| 3,281,301 | A * | 10/1966 | Bolesky ............... | 156/221 |
| 5,144,708 | A | 9/1992 | Pekar | |
| 5,342,463 | A * | 8/1994 | Addeo et al. ......... | 156/156 |
| 5,638,565 | A | 6/1997 | Pekar | |
| 6,497,786 | B1 * | 12/2002 | Kilgore et al. ........ | 156/379.8 |
| 6,766,599 | B2 | 7/2004 | Baek | |
| 6,785,985 | B2 | 9/2004 | Marvin et al. | |
| 6,818,091 | B1 | 11/2004 | Holland et al. | |
| 7,047,670 | B2 * | 5/2006 | Marvin et al. ........ | 36/29 |
| 2003/0101619 | A1 * | 6/2003 | Litchfield et al. ..... | 36/29 |
| 2004/0003517 | A1 | 1/2004 | Marvin et al. | |
| 2004/0055640 | A1 | 3/2004 | Dojan et al. | |
| 2005/0028404 | A1 | 2/2005 | Marvin et al. | |
| 2007/0000605 | A1 * | 1/2007 | Millette et al. ........ | 156/308.4 |

OTHER PUBLICATIONS

"Stevens Urethane Film & Sheet: The high-performance material for today's 'can't fail' applications," Stevens Urethane, Holyoke, MA (date unknown).
Printout of Stevens Urethane website at www.stevensurethane.com/filmsheet/filmsheet_aromatic.html entitled "Aromatic Sheet," (date unknown).
Stevens Urethane "ST-1880 Polyether, Polyurethane" information Sheet, (date unknown).
Printout of Stevens Urethane website at www.stevensurethane.com/urethanepeople/callout_atheleticshoe.gif entitled "Athletic Shoes," (date unknown).

* cited by examiner

*Primary Examiner*—Marie Patterson
(74) *Attorney, Agent, or Firm*—Sterne, Kessler, Goldstein & Fox P.L.L.C.

(57) ABSTRACT

An inflatable bladder for use in an article of footwear including a first sheet of a flexible fluid-impervious material and a second sheet of flexible fluid-impervious material. The first sheet and the second sheet are sealed along air-tight weld lines forming at least one narrow channel. The inflatable bladder includes an air passage device for maintaining air flow within the narrow channel. In one embodiment, the first sheet has an embossed interior surface to limit the contact between the first sheet and second sheet. Another embodiment includes the use of a mechanical device to separate the first sheet and the second sheet within a narrow channel. A method of manufacturing an inflatable bladder, a method of increasing localized air flow though a narrow channel of an inflatable bladder for use in an article of footwear and an article of footwear incorporating the inflatable bladder are also described.

26 Claims, 5 Drawing Sheets

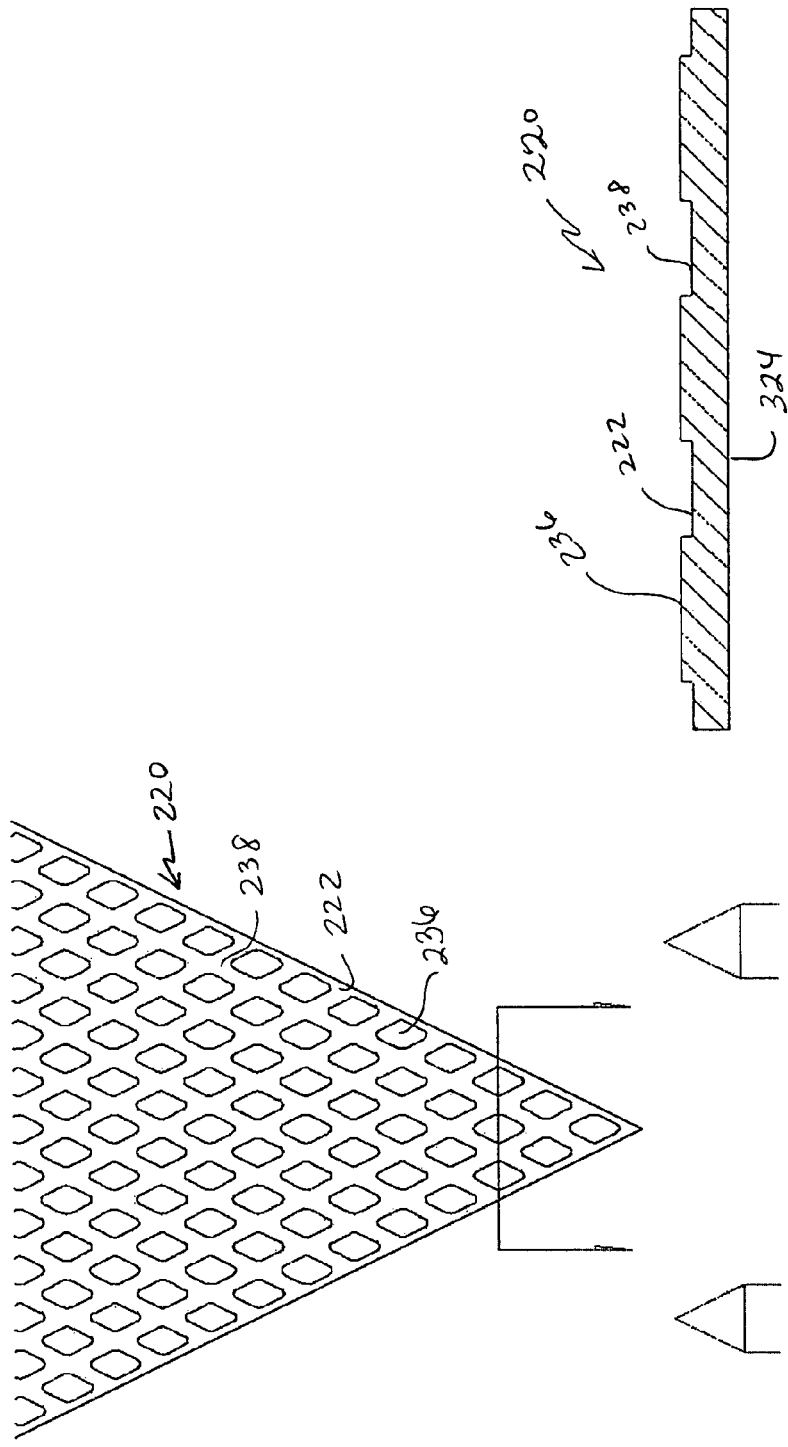

AIR PASSAGE DEVICE FOR INFLATABLE SHOE BLADDERS

FIELD OF THE INVENTION

The present invention relates generally to the use an air passage device in the manufacture of inflatable bladders for use in athletic footwear and to athletic footwear including such a bladder.

BACKGROUND OF THE INVENTION

Inflatable bladders have been used in articles of footwear as cushioning within shoe soles and shoe uppers. When positioned within a shoe upper, an inflatable bladder may be used to provide cushioning as well as improve the fit of the article of footwear. In some cases, the bladder may be used instead of conventional lacing to hold the shoe on the foot of the user. Inflatable bladders may also be used under the foot of the wearer to cushion the impact of the foot as it moves through a gait cycle.

Inflatable bladders may be, for example, formed from two sheets of fluid-impervious thermoplastic film that have been sealed together to form an air-tight chamber. For example, U.S. Pat. No. 6,785,985 and U.S. patent application Ser. No. 10/887,927, which are incorporated by reference herein in its entirety, disclose bladders formed from sheets of a light urethane film, a polyester film such as MYLAR®, an ethyl vinyl acetate film or another barrier film. For example, bladders for footwear have been made from a matted polyurethane film commercially available from J. P. Stevens & Co (Easthampton, Mass.) under the product number ST-1880 M2. Two sheets of thermoplastic film are sealed along various weld lines, for example by radio frequency (RF) welding, to form an air-tight inflatable bladder.

However, where weld lines are close together and form a narrow fluid channel within the bladder, air movement through the narrow channels may become restricted causing squeaking with each step taken by the wearer due to tight flow tolerances. Also, the interior surfaces of the bladder may have a tendency to temporarily adhere or stick together, due to static, friction or the nature of the materials.

BRIEF SUMMARY OF THE INVENTION

One embodiment of the present invention is an inflatable bladder for use in an article of footwear including a first sheet of a flexible fluid-impervious material and a second sheet of flexible fluid-impervious material. The first sheet and the second sheet are sealed along air-tight weld lines forming at least one narrow channel. The inflatable bladder includes an air passage device for maintaining air flow within the narrow channel. The air passage device limits the surface contact between the first and second sheets and avoids noises caused by restricted air movement along narrow channels.

Another embodiment of the present invention is an article of footwear including an upper, a sole attached to the upper, and an inflatable bladder introduced into at least one of the upper and the sole. The inflatable bladder includes a first sheet of a flexible, fluid-impervious material and a second sheet of flexible, fluid-impervious material. The first sheet and the second sheet are sealed along an air-tight peripheral weld line, and at least the first sheet has an embossed interior surface.

Another embodiment of the present invention is an inflatable bladder for use in an article of footwear including a first sheet of a flexible, fluid-impervious material and a second sheet of flexible, fluid-impervious material. The first sheet and the second sheet are sealed along an air-tight peripheral weld line. At least the first sheet has an embossed interior surface.

Another embodiment of the present invention is a method of increasing localized air flow through a narrow channel of an inflatable bladder for use in an article of footwear. The method includes providing a first flexible, fluid-impervious sheet and a second flexible, fluid-impervious sheet. The first sheet and the second sheet are sealed along air-tight weld lines to form an inflatable bladder having at least one narrow channel. An air passage device is provided at least within the narrow channel.

Another embodiment of the present invention is a method of manufacturing an inflatable bladder for an article of footwear. The method includes providing a first flexible, fluid-impervious sheet and a second flexible, fluid-impervious sheet. The first sheet includes a first embossed interior surface. The first embossed interior surface is positioned adjacent to and facing a second interior surface of the second sheet. The first and second sheets are sealed together along a desired peripheral weld line to form an air-tight bladder. The first and second sheets are cut out along an exterior edge of the peripheral weld line.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 2 is a plan view of an embossed film for use in the present invention.

FIG. 3 is a sectional view taken along line A-A of FIG. 2.

The present invention will be described with reference to the accompanying drawings. The drawing in which an element first appears is typically indicated by the leftmost digit(s) in the corresponding reference number.

DETAILED DESCRIPTION OF THE INVENTION

Figure 1:
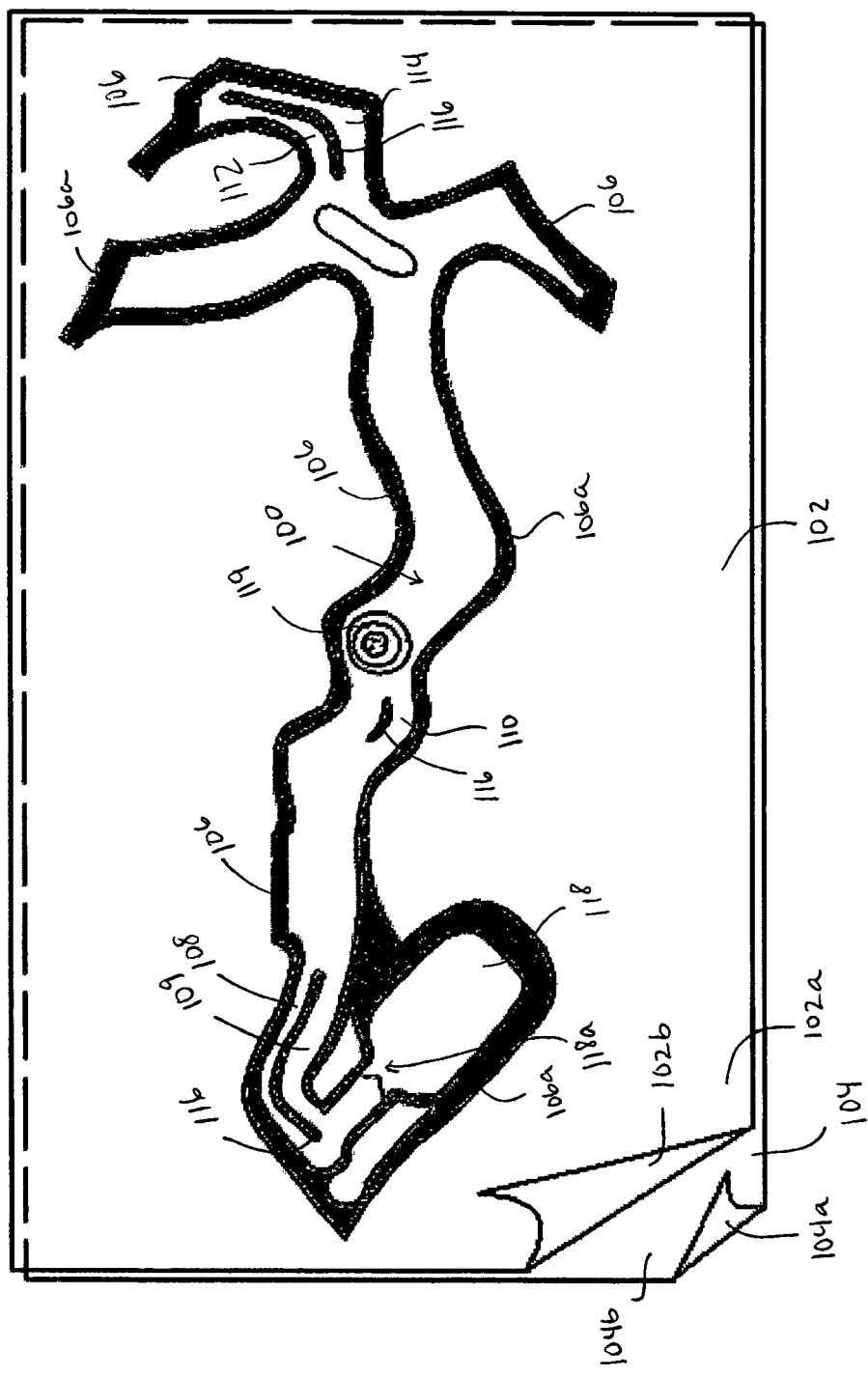
FIG. 1 is depiction of the manufacturing process used to form a bladder of an article of footwear of the present invention.

It is desirable for inflatable bladders for athletic shoes to be light weight, flexible and simple to manufacture. FIG. 1 illustrates one method for manufacturing an inflatable bladder 100 for use in athletic shoes. Bladder 100 may be formed from a first sheet 102 and a second sheet 104 of a flexible, fluid-impervious thermoplastic film. First sheet 102 has an exterior surface 102a and an interior surface 102b, and second sheet 104 has an exterior surface 104a and an interior surface 104b.

Bladder 100 is formed where first sheet 102 and second sheet 104 are sealed together. For example, in FIG. 1, first sheet 102 and second sheet 104 are sealed along an air-tight peripheral weld line 106. Narrow channels 108, 109, 110, 112 and 114 are formed within bladder 100, where interior weld lines 116 further seal first sheet 102 to second sheet 104. In order to avoid tight flow tolerances within narrow channels 108, 109, 110, 112 and 114 or anywhere else in bladder 100, bladder 100 may include an air passage device between the interior surface 102b of first sheet 102 and interior surface 104b of second sheet 104. The air passage device may be an embossed or texturized surface of at least one of interior surface 102b or interior surface 104b or a mechanical device inserted into the bladder, both of which are described in further detail below. The air passage device provides space between first sheet 102 and second sheet 104 within a narrow channel, alleviates constriction of air flow through these narrow channels and avoids noise caused by air flow restriction.

Sheets 102 and 104 may be similar or different materials provided that they are each made from a fluid-impervious thermoplastic film and that they may be bonded together to form an air-tight seal. Sheets 102 and 104 include at least a layer of a thin thermoplastic film. Thermoplastic films can be formed from a variety of thermoplastic resins or other elastomeric materials, including, but not limited to, polyurethanes (TPU), ethylenevinylacetate/polyethylene copolymer; polyester elastomer (Hytrel); ethylenevinylacetate/polypropylene copolymer; polyethylene; polypropylene; neoprene; natural rubber; dacron/polyester; polyvinylchloride; thermoplastic rubbers; nitrile rubber; butyl rubber; sulfide rubber; polyvinyl acetate; methyl rubber; buna N.; buna S.; polystyrene; ethylene propylene; polybutadiene; polypropylene; silicone rubber, chlorsulfonated polyethylene, nylon and other thermoplastic or elastomeric materials. One particular example is a polyester urethane film having a 85A shore hardness and a melting temperature of 150° C., available from Hyo-Sung Corp. (Korea). One skilled in the art can appreciate that any number of thermoplastic or elastomeric materials are suitable for use in the present invention, provided such material is fluid-impervious and capable of forming an air-tight seal with a similar or different thermoplastic or elastomeric materials.

As discussed above, sheets 102 and 104 are sealed together along a peripheral weld line 106. Several methods have been developed to form an air tight seal between sheets of thermoplastic films. Some non-limiting examples of sealing techniques include ultrasonic welding, radio frequency (RF) welding, thermal welding and airtight adhesive bonding. One skilled in the art can appreciate that the particular choice of sealing techniques is dependent upon the type of material used for first sheet 102 and second sheet 104.

The thermoplastic film may be used alone to form bladder 100 or the thermoplastic film may be formed as a laminate of the thermoplastic film and a substrate. In this embodiment, the substrate generally forms the exterior surface 102a of first sheet 102, the exterior surface 104a of second sheet 104 or both, such that the interior surfaces 102b and 104b, which contact each other, are thermoplastic films.

Substrates may be any of a variety of textiles, for example any synthetic or natural fibers or fabrics. One non-limiting example of a fabric used as a laminate in bladders for athletic shoes is a non-woven high density 70% nylon and 30% polyester blend, available from Dae Woo International Corp. (Pusan, Korea). Several methods have been developed to form laminates between thermoplastic films and substrates. One such method includes direct cast extrusion of a thermoplastic resin onto a substrate to form a thin film thereon. Provided that the substrate is at least partially porous, the thermoplastic film will permeate a portion of the substrate and bond thereto. Other laminate forming methods known to those skilled in the art would also be suitable for forming a laminate of the present invention. For example, a laminate may be formed from a thermoplastic film and a substrate by adhering the thermoplastic film to the substrate via heat and pressure, via an adhesive bonding material or via ultrasonic bonding. In another embodiment, first sheet 102 and/or second sheet 104 may be made from a multiple-layer laminate including one or more thermoplastic film layers and one or more substrate layers, provided that the laminate is fluid-impervious and an air tight seal may be formed between interior surface 102b and interior surface 104b.

Unlike the matted polyurethane conventionally used to form inflatable bladders for footwear, FIGS. 2 and 3 show an example of a piece of a thermoplastic film 220, which may be used to form a bladder of the present invention, such as bladder 100 of FIG. 1. FIG. 3 is a cross section taken along line A-A of FIG. 2. Thermoplastic film 220 has a first surface 222 and a second surface 324. First surface 222 is an embossed or textured surface having raised areas 236 on a lower-profile background area 238. An embossed or textured surface is preferably used as interior surface 102b, as interior surface 104b, or both of the bladder shown in FIG. 1. Having at least one embossed interior surface provides less contact between the interior surface 102b and interior surface 104b, to avoid adhesion or sticking between first sheet 102 and second sheet 104. Additionally, the embossed interior surface reduces or eliminates noise in fluid channels, such as channels 108, 109, 110, 112 and 114 of bladder 100, by providing additional flow clearances to improve air movement between first sheet 102 and second sheet 104. In another embodiment, first surface 222 may also be used to form exterior surface 102a, exterior surface 104a or both, for example when a particular texture is desired on the exterior of a shoe upper. In yet another embodiment, both first surface 222 and second surface 324 may be embossed similar to first surface 222 in FIGS. 2 and 3.

An advantage provided by the embossed surface comes from the particular depth between the raised areas 236. The raised areas 236 in the embodiment of FIGS. 2 and 3 are generally diamond-shaped and may protrude about 0.01 mm to about 0.10 mm from the lower-profile background area 238, preferably about 0.05 mm to about 0.90 mm. The overall thickness of the thermoplastic film 220 is about 0.20 mm to about 0.40 mm. However, a most preferred thermoplastic film may include raised areas 236 that protrude about 0.8 mm from lower-profile background area 238, with an overall thickness of the thermoplastic film being about 0.30 mm to about 0.32 mm. One skilled in the art can appreciate that embossed surfaces may have a variety of textures or patterns and may have raised areas that have a variety of dimensions and protrude any distance from a lower-profile background area, provided that the embossed surface enhances air movement through narrow channels. Further, an embossed surface may have no consistency in the dimensions of various adjacent raised areas.

The embossed first surface 222 may be added to a thermoplastic film in several ways. For example, a thermoplastic resin which has been extruded into a thin film may be subsequently embossed in a continuous process via an emboss roller at the casting location, whether or not cast onto a substrate as discussed in detail above. An emboss roller imprints the embossed pattern into the surface of the thermoplastic film. Alternatively, a thermoplastic film may be subsequently heated and embossed on a similar emboss roller. A thermoplastic film may be embossed before or after being bonded to a substrate, in the manner discussed above. Downstream from the emboss roller, a thickness sensor may be employed to gauge the consistency of the embossed dimensions. Alternatively, commercially available embossed material may be used in forming bladder 100 of FIG. 1.

In the embodiment in FIG. 1, an inflation device 118, including a one-way valve 118a, and a deflation device 119 have been incorporated into bladder 100. However, in alternative embodiments, an inflation device and a deflation device may be attached after forming bladder 100. For example, an inflation device may be a separate entity which is later coupled to bladder 100 via tubing or other fluid conduits. In yet another embodiment, an inflation device may not be an "on-board" inflation device. Instead, the inflation device may be temporarily coupled to bladder 100 via a valve only when inflation is desired by the user. Some examples of inflation and deflation devices, including self-actuating inflation devices, are more fully described in U.S. patent application Ser. No. 10/887,927, which is incorporated herein in its entirety by reference. One skilled in the art can appreciate that a variety of inflation and/or deflation devices may be provided in a bladder of the present invention.

Once formed, bladder 100 is cut away from the remaining portions of first sheet 102 and second sheet 104 along an exterior edge 106a of the peripheral weld line 106 and incorporated into an article of footwear. Bladder 100 may be bonded, such as by the use of adhesives or other bonding techniques, or sewed to other shoe materials, preferably along the peripheral weld line 106.

Figure 4:
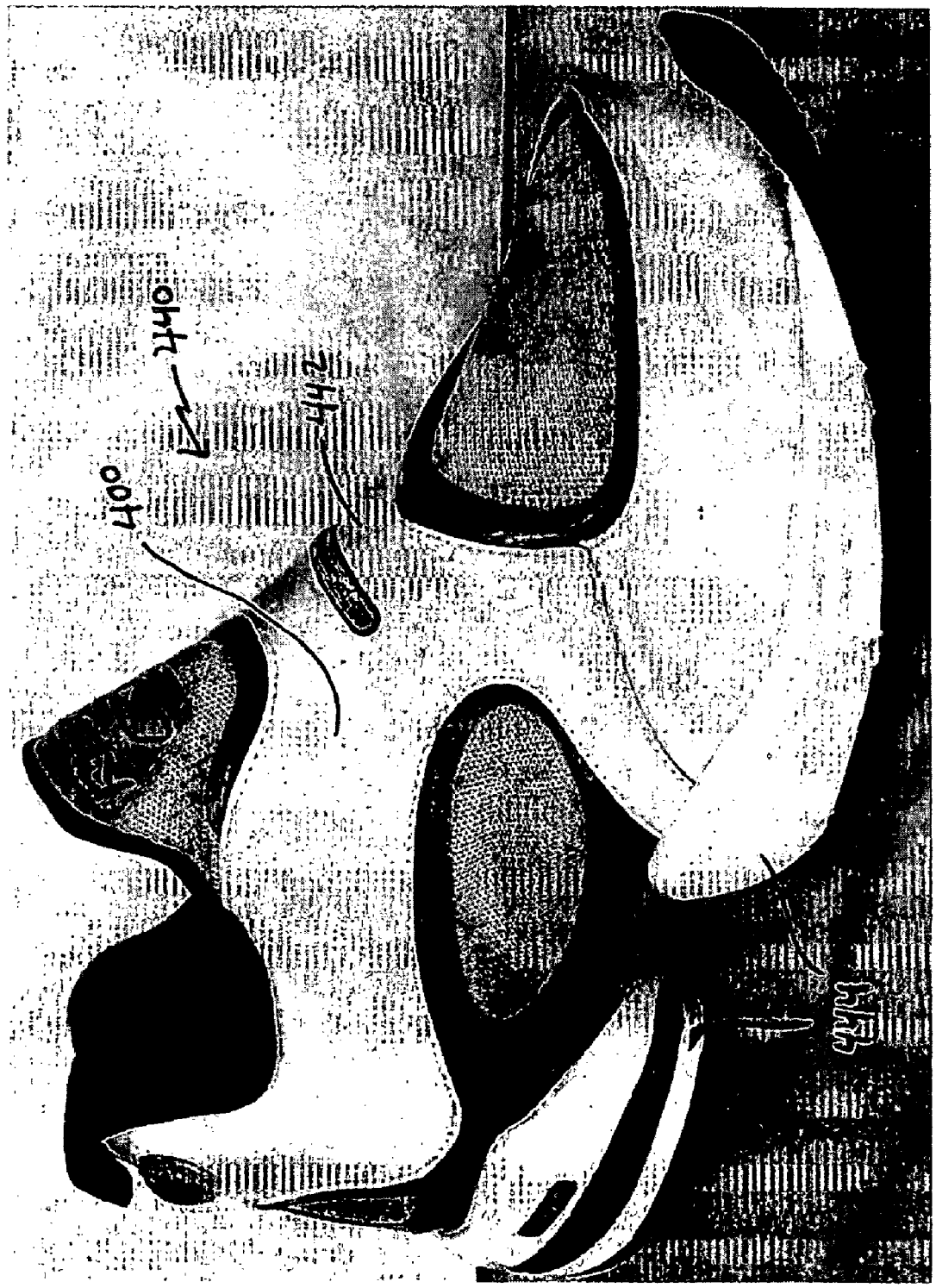
FIG. 4 is a perspective view of an embodiment of an article of footwear of the present invention.

FIG. 4 illustrates a shoe 440 including a bladder 400 formed by the method illustrated in FIG. 1. Although FIG. 4 illustrates a right shoe, a left shoe would be a mirror image of shoe 440. Shoe 440 includes an upper 442 and a sole 444 attached to upper 442. In the embodiment of FIG. 4, bladder 400 is part of upper 442 and extends under the foot of the wearer and into sole 444. In alternative embodiments, a bladder may be positioned within a shoe in only an upper or a sole. Further, bladder 400 may be used alone to form a portion of the upper, or may be combined with other cushioning materials, or any other conventional upper materials, to add comfort to the wearer. Similarly, bladder 400 placed in the sole of a shoe may be supported by conventional sole material, for example EVA foam or a lightweight durable EVA foam composite for supporting and cushioning the wearer's foot from forces exerted during normal exercise or athletic activity.

Figure 5:
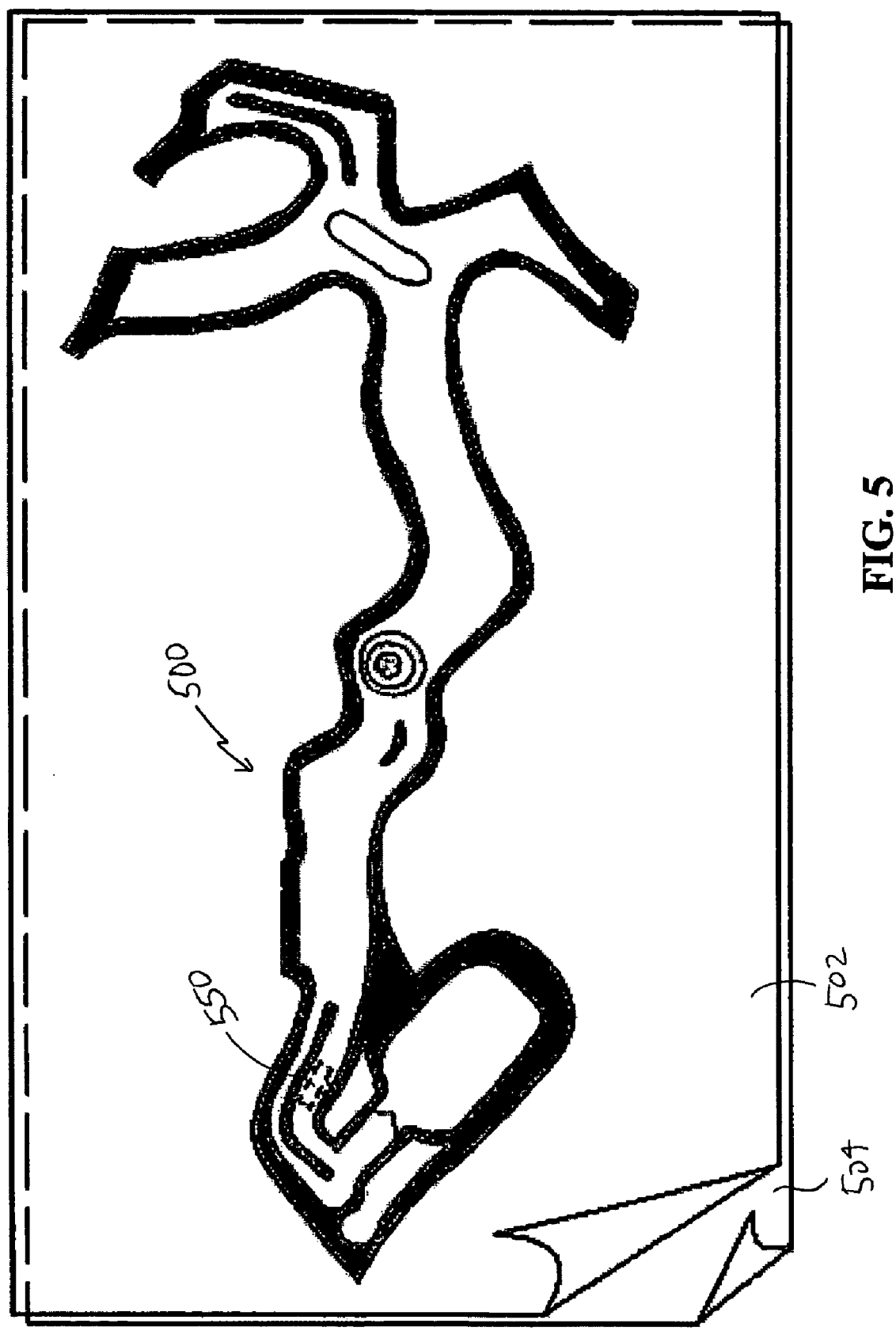
FIG. 5 is an alternative depiction of the manufacturing process used to form a bladder of an article of footwear of the present invention.
Figure 6:
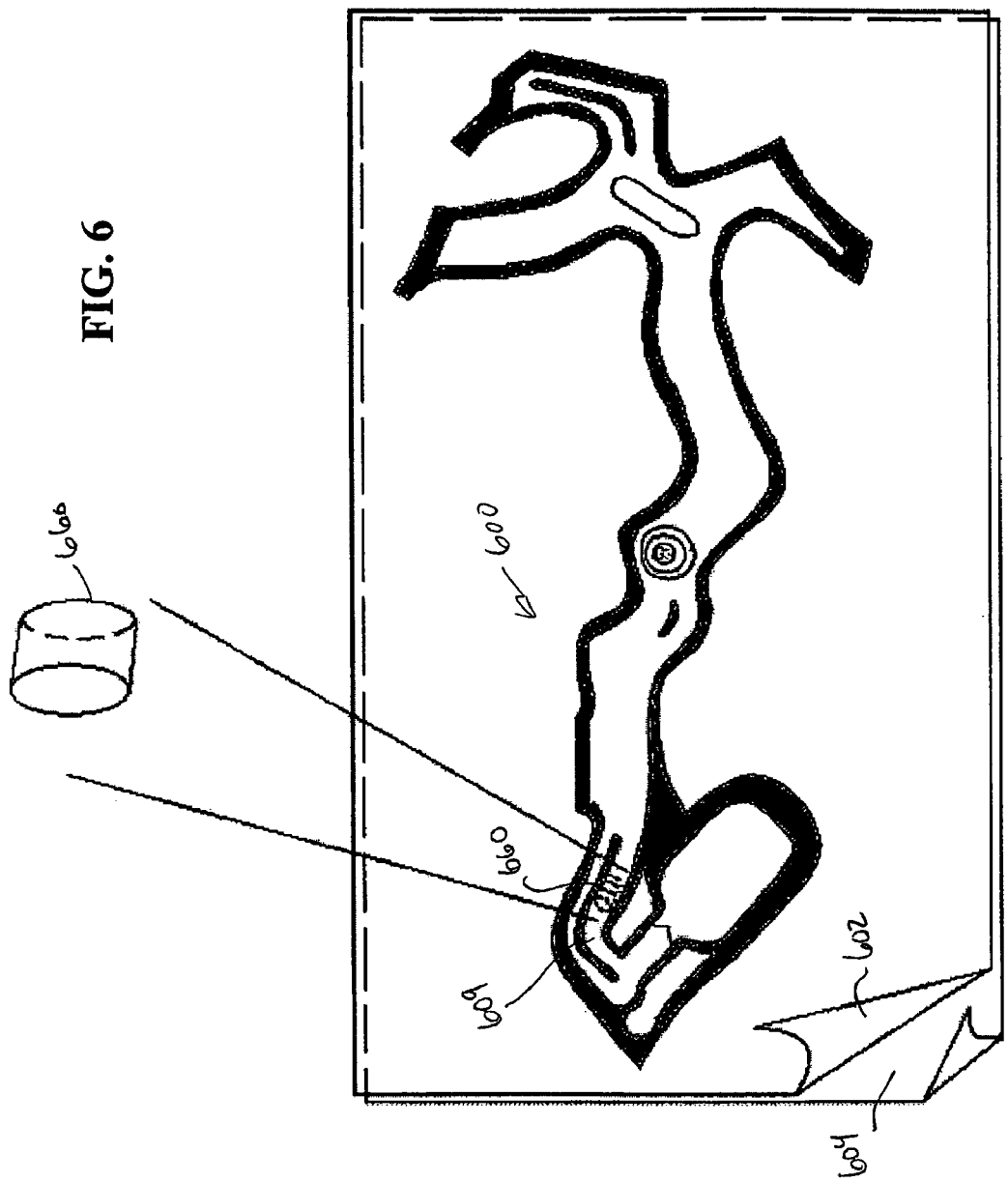
FIG. 6 is an alternative depiction of the manufacturing process used to form a bladder of an article of footwear of the present invention.

Utilizing an embossed material is only one air passage device that may be used to alleviate air flow restrictions within narrow channels. In other embodiments, such as those shown in FIGS. 5 and 6, mechanical devices may be inserted into the narrow channels to avoid constriction caused by the thermoplastic films. For example, in FIG. 5, a small piece of reticulated or open celled foam 550 may be placed in a localized area within a bladder 500 where air flow restriction may occur. The foam 550 holds the first sheet 502 spaced apart from second sheet 504 in narrow channels, such as within narrow channel 509. FIG. 6 illustrates another type of mechanical device placed within a narrow channel 609 of a bladder 600. In this embodiment, a stent 660 or a piece of tubing, may be inserted into a narrow channel 609 of an inflatable bladder 600. Stent 660 will also hold apart sheet 602 from sheet 604 to allow air to flow freely in narrow channel 609 and alleviate air flow constriction in this area. One skilled in the art can appreciate that any number of mechanical devices, such as a set of ribs or a piece of any textile substrate, may be positioned within a narrow channel to maintain the air passage provided between a first and second sheet of thermoplastic film. In yet another embodiment, a substrate, such as the substrates described above may be laminated, as discussed above, to a particular location on an interior surface of one of a first sheet or a second sheet to avoid having the first sheet adhere to the second sheet and to maintain the air passage between the first and the second sheets, for example in a narrow channel of a bladder. A bladder including a mechanical device, such as those described above, may also be used in a shoe, such as that described above with respect to FIG. 4.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An article of footwear comprising:
   an upper;
   a sole attached to said upper; and
   an inflatable bladder introduced into at least one of said upper and said sole;
   wherein said inflatable bladder includes a first sheet of a fluid-impervious material having an interior surface and a second sheet of fluid-impervious material having an interior surface, wherein said first sheet and said second sheet are sealed wherein at least a portion of the interior surface of said first sheet is in contact with at least a portion of the interior surface of said second sheet, and wherein substantially all of said first sheet has an embossed interior surface that limits said interior surface contact between said first and second sheets.

2. The article of footwear of claim 1, wherein a portion of said second sheet has an embossed interior surface.

3. The article of footwear of claim 1, wherein at least said first sheet includes a layer of thermoplastic film.

4. The article of footwear of claim 3 wherein at least said first sheet is a laminate of a thermoplastic film and substrate.

5. The article of footwear of claim 4, wherein said substrate is a textile.

6. The article of footwear of claim 5, wherein said substrate is a non-woven nylon and polyethylene blend.

7. The article of footwear of claim 3, wherein said thermoplastic film is selected from the group consisting of polyurethanes, ethylenevinylacetate/polyethylene copolymer; polyester elastomer; ethylenevinylacetate/polypropylene copolymer; polyethylene; polypropylene; neoprene; natural rubber; dacron/polyester; polyvinylchloride; thermoplastic rubbers; nitrile rubber; butyl rubber; sulfide rubber; polyvinyl acetate; methyl rubber; buna N.; buna S.; polystyrene; ethylene propylene; polybutadiene; polypropylene; silicone rubber, chlorsulfonated polyethylene and nylon.

8. The article of footwear of claim 7, wherein said thermoplastic film is selected from a group consisting of a polyester urethane film and a polyether urethane film.

9. An inflatable bladder for use in an article of footwear, comprising: a first sheet of a fluid-impervious material having an interior surface and a second sheet of fluid-impervious material having an interior surface, wherein at least a portion of an interior surface of said first sheet is in contact with at least a portion of the interior surface of said second sheet, wherein said first sheet and said second sheet are sealed and substantially all of said first sheet has an embossed interior surface that limits said interior surface contact between said first and second sheets.

10. The inflatable bladder of claim 9, wherein at least a portion of said second sheet has an embossed interior surface.

11. The inflatable bladder of claim 9, wherein each of said first and second sheets includes a layer of thermoplastic film.

12. The inflatable bladder of claim 11 wherein at least one of said first sheet and said second sheet is a laminate of a thermoplastic film and substrate.

13. The inflatable bladder of claim 12, wherein said substrate is made from a textile.

14. The inflatable bladder of claim 13, wherein said substrate is a non-woven nylon and polyethylene blend.

15. The inflatable bladder of claim 11, wherein said thermoplastic film is selected from the group consisting of polyurethanes, ethylenevinylacetate/polyethylene copolymer; polyester elastomer; ethylenevinylacetate/polypropylene copolymer; polyethylene; polypropylene; neoprene; natural rubber; dacron/polyester; polyvinylchloride; thermoplastic rubbers; nitrile rubber; butyl rubber; sulfide rubber; polyvinyl acetate; methyl rubber; buna N.; buna S.; polystyrene; ethylene propylene; polybutadiene; polypropylene; silicone rubber, chlorsulfonated polyethylene and nylon.

16. The inflatable bladder of claim 15, wherein said thermoplastic film is selected from a group consisting of a polyester urethane film and a polyether urethane film.

17. A method of manufacturing an inflatable bladder for an article of footwear, comprising: providing a first fluid-impervious sheet having an interior surface and a second fluid-impervious sheet having an interior surface, wherein at least a portion of the interior surface of said first sheet is in contact with at least a portion of the interior surface of said second sheet, wherein substantially all of said first sheet includes a first embossed interior surface that limits said interior surface contact between said first and second sheets; positioning said first embossed surface interior surface adjacent to and facing a second interior surface of said second sheet; and sealing said first and second sheets together to form an inflatable bladder.

18. The method of claim 17, wherein at least a portion of said second interior surface is an embossed surface.

19. The method of claim 17, wherein each of said first and second sheets includes a layer of a thermoplastic film.

20. The method of claim 19 wherein at least one of said first sheet and said second sheet is a laminate of a thermoplastic film and substrate.

21. The method of claim 20, wherein said substrate is made from a textile.

22. The method of claim 21, wherein said substrate is a non-woven nylon and polyethylene blend.

23. The method of claim 19, wherein said thermoplastic film is selected from the group consisting of polyurethanes, ethylenevinylacetate/polyethylene copolymer; polyester elastomer; ethylenevinylacetate/polypropylene copolymer; polyethylene; polypropylene; neoprene; natural rubber; dacron/polyester; polyvinylchloride; thermoplastic rubbers; nitrile rubber; butyl rubber; sulfide rubber; polyvinyl acetate; methyl rubber; buna N.; buna S.; polystyrene; ethylene propylene; polybutadiene; polypropylene; silicone rubber, chlorsulfonated polyethylene and nylon.

24. The method of claim 23, wherein said thermoplastic film is selected from a group consisting of a polyester urethane film and a polyether urethane film.

25. An inflatable bladder for use in an article of footwear comprising:
   a first sheet of a fluid-impervious material having an interior surface;
   a second sheet of a fluid-impervious material having an interior surface, wherein at least a portion of the interior surface of said first sheet is in contact with at least a portion of the interior surface of said second sheet, wherein said first sheet and said second sheet are sealed; and
   at least one narrow channel between said first and second sheets, wherein at least a portion of an interior surface of said first sheet along said narrow channel is embossed to limit said interior surface contact between said first and second sheets,
   wherein a substrate is laminated to a portion of an interior surface of at least said first sheet, and wherein said first sheet includes an embossed thermoplastic film, and wherein said first sheet is a laminate of a thermoplastic film and substrate.

26. A method of increasing localized air flow through a narrow channel of an inflatable bladder for use in an article of footwear, comprising:
   providing a first fluid-impervious sheet having an interior surface and a second fluid-impervious sheet having an interior surface, wherein at least a portion of the interior surface of said first sheet is in contact with at least a portion of the interior surface of said second sheet;
   embossing at least a portion of an interior surface of one of said first or second sheets to limit said interior surface contact between said first and second sheets;
   sealing said first sheet and said second sheet to form an inflatable bladder having at least one narrow channel,
   wherein said embossed material is a substrate laminated to a portion of an interior surface of at least said first sheet.

* * * * *